Dec. 7, 1926.
C. H. BOYLE
CORING DEVICE
Filed Dec. 3, 1925
1,609,456
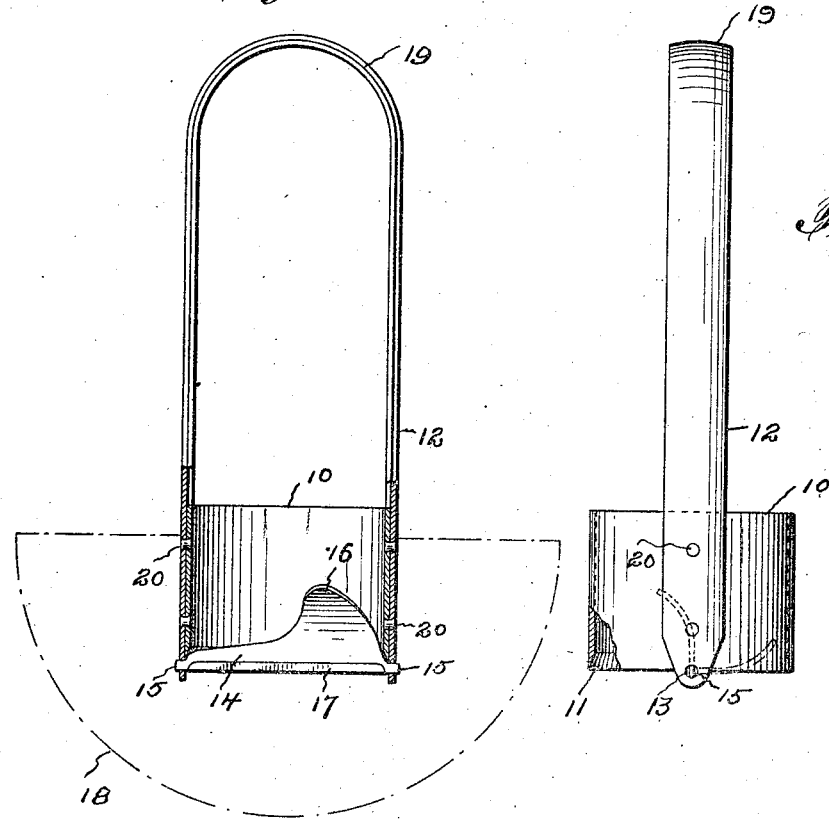
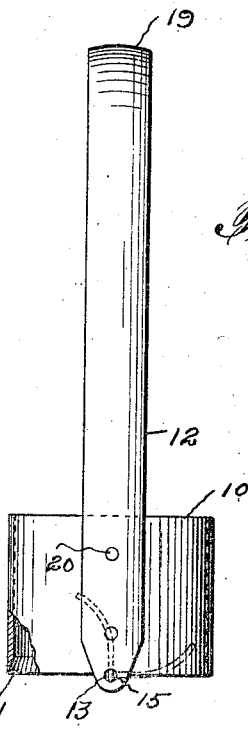
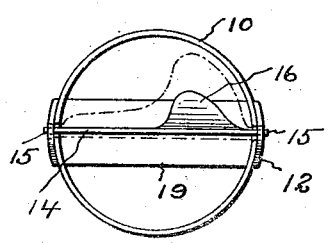
INVENTOR
Charles H. Boyle
BY
ATTORNEY Patented Dec. 7, 1926.

1,609,456

UNITED STATES PATENT OFFICE.

CHARLES H. BOYLE, OF NEW HAVEN, CONNECTICUT.

CORING DEVICE.

Application filed December 3, 1925. Serial No. 73,034

The present invention relates to new and useful improvements in coring devices of the type used for removing the core and seeds of a grapefruit or the like.

It is the object of this invention, among other things, to provide a device of this character that will be economical to construct, may be easily positioned and effective in its operation.

Referring to the drawings, in which like numerals of reference designate like parts in the several figures;

Figures 1 and 2 are elevations of my device; and

Figure 3 is a view of the bottom thereof with the movable blade in its flat position.

In the practice of my invention, I employ a tubular cutter 10, having a knife edge 11 around the bottom thereof, and to which is secured the lower ends of the bow-shaped handle 12, by studs 20, or the like, or in any other convenient manner.

The blade 14 is provided with trunnions 15, which are journaled in the openings 13 in the lower end of the handle 12 adjacent to the knife edge of the tubular cutter 10. The center of these openings is preferably in the same plane as the knife edge 11. This blade has a curved portion 16 and a cutting edge 17.

After the fruit has been cut transversely, a portion of which is illustrated by broken lines 18 in Figure 1, the coring device is placed upon the top thereof with the knife edge 11 in contact with the pulp, the blade 14 then lying flat, substantially as shown by broken lines at the right of Figure 3. Pressure is then applied to the handle 12 upon the head 19 thereof and the cutter is forced downwardly through the pulp until the lower end thereof substantially contacts with the inside of the fruit skin. At the beginning of this operation the blade 14 swings upon its trunnions until it lies in a substantially vertical position, as shown in Figure 1. As thus positioned, the blade and tubular cutter pass through the core and pulp.

When projected into the grapefruit to its fullest extent the device is rotated about its axis and the blade 14 again swings upon its trunnions and returns to its horizontal position, substantially as shown by broken lines in Figures 2 and 3. This movement of the blade from a vertical to a horizontal position, and vice versa, being facilitated by the curved portion 16, which is upon one side of the axis of the tubular cutter. This rotation of the device, when imbedded in the grapefruit cuts off at the bottom that portion of the core and pulp within the tubular cutter. As the device is withdrawn from the grapefruit the core and seeds are removed with it, being prevented from falling out of the cutter 10 by the blade 14. Thus the core and seeds of a grapefruit are completely severed and removed from the fruit at a single operation.

During the rotation of the tubular cutter, the knife edge thereof and the cutting edge of the blade 14 are in the same plane, this being permissible by reason of the relative positions of the openings 13.

Not only the shape of the handle and blade, etc., but in other ways the details of my invention may be varied, and therefore, I do not limit myself to the exact construction herein shown and described, but claim all that falls fairly within the spirit and scope of the appended claims.

Having described my invention, what I claim as new and desire to secure by Letters Patent, is:—

1. In a device of the character described; a tubular cutter; and a blade having an offset portion upon one side thereof pivotally connected therewith in substantially the same plane as the cutting edge of the tubular cutter.

2. In a device of the character described; a tubular cutter; a handle; and a blade movably mounted so as to vary its position in operation by differing directions of pressure of the tubular cutter, irrespective of the position of either the cutter or handle.

3. In a device of the character described; a tubular cutter; and a blade pivotally connected therewith at substantially a right angle to the axis of the cutter, the position of the blade being in part determined by the direction of pressure applied to the cutter.

4. In a device of the character described; a tubular cutter; and a blade pivotally connected therewith, the blade being straight for a portion of its length and curved for another portion.

5. In a device of the character described; a tubular cutter; and a blade pivotally connected therewith, the blade being straight for a portion of its length and curved for another portion with a cutting edge upon the straight portion.

6. In a device of the character described;

a tubular cutter; a handle connected therewith; and a blade having an offset portion upon one side thereof pivotally mounted in the handle and extending across the cutting edge of the tubular cutter.

7. In a device of the character described; a tubular cutter; and an independently moving blade connected therewith, the position of the blade relative to the tubular cutter being determined in part by the direction of the pressure upon the tubular cutter.

8. In a device of the character described; a tubular cutter; and an independently moving blade connected therewith, the blade automatically assuming a position parallel with the open end of the tubular cutter when a rotary pressure is applied to the tubular cutter and a position at right angles to the position just described when a substantially straight endwise pressure is applied to the tubular cutter.

9. In a device of the character described; a tubular cutter; and a blade pivotally connected therewith, the blade being straight for a portion of its length and curved for another portion, the curved portion being upon one side of the axis of the tubular cutter.

10. In a device of the character described; a tubular cutter; a handle; and a blade having trunnions at the opposite ends thereof journaled within the handle adjacent to the tubular cutter.

11. In a device of the character described; a tubular cutter; a handle connected therewith, the ends of which project beyond the cutting edge of the tubular cutter; and a blade having trunnions at the opposite ends thereof journaled in part in that portion of the handle that projects beyond the edge of the tubular cutter.

12. In a device of the character described; a tubular cutter; a handle; and a blade having trunnions at the opposite ends thereof journaled within the handle adjacent to the tubular cutter in such manner that the cutting edge of the blade may in one of its positions occupy the same plane as the knife edge of the tubular cutter.

13. In a device of the character described; a tubular cutter; and a blade pivotally connected therewith whereby it may function in a path substantially parallel with the axis of the tubular cutter, or at substantially a right angle thereto, these different positions of the blade being determined in part by the direction of pressure applied to the tubular cutter.

14. In a device of the character described; a tubular cutter; and a blade pivotally connected therewith, the position of the blade being in part determined by its contact with the material engaged thereby.

15. In a device of the character described; a tubular cutter, and a blade pivotally connected therewith, said blade by reason of its contact with the fruit making a cut therein substantially parallel with the axis of the tubular cutter while pressure is applied to the holder, substantially parallel to its axis; and a cut substantially parallel with the cutting edge of the tubular cutter when the latter is moved about its axis.

16. In a device of the character described; a tubular cutter, and a blade pivotally connected therewith, said blade by reason of its contact with the fruit making a cut therein substantially parallel with the axis of the tubular cutter while pressure is applied to the holder, substantially parallel to its axis; and a cut substantially parallel with the cutting edge of the tubular cutter when the latter is moved about its axis, both positions of the blade being determined by contact of the cutter with the fruit.

In testimony whereof, I have hereunto affixed my signature.

CHARLES H. BOYLE.